United States Patent
Kudlur

(10) Patent No.: US 9,134,979 B2
(45) Date of Patent: Sep. 15, 2015

(54) CONVERGENCE ANALYSIS IN MULTITHREADED PROGRAMS

(71) Applicant: NVIDIA CORPORATION, Santa Clara, CA (US)

(72) Inventor: Manjunath Kudlur, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 42 days.

(21) Appl. No.: 13/760,946

(22) Filed: Feb. 6, 2013

(65) Prior Publication Data

US 2014/0223420 A1    Aug. 7, 2014

(51) Int. Cl.
G06F 9/45    (2006.01)

(52) U.S. Cl.
CPC .............. *G06F 8/45* (2013.01); *G06F 8/4451* (2013.01)

(58) Field of Classification Search
None
See application file for complete search history.

(56) References Cited

U.S. PATENT DOCUMENTS

| | | | | |
|---|---|---|---|---|
| 5,257,363 | A * | 10/1993 | Shapiro et al. | 703/13 |
| 8,381,203 | B1 * | 2/2013 | Beylin et al. | 717/150 |
| 2005/0097536 | A1 * | 5/2005 | Bernstein et al. | 717/156 |
| 2009/0133019 | A1 * | 5/2009 | Dumas et al. | 718/100 |
| 2009/0172013 | A1 * | 7/2009 | Gupta et al. | 707/103 R |
| 2009/0259997 | A1 * | 10/2009 | Grover et al. | 717/136 |
| 2013/0191817 | A1 * | 7/2013 | Vorbach | 717/150 |
| 2013/0241941 | A1 * | 9/2013 | Donaldson et al. | 345/505 |
| 2013/0305021 | A1 * | 11/2013 | Grover et al. | 712/214 |

OTHER PUBLICATIONS

Scherrer et al., Probability Convergence in a Multithreaded Counting Application, in International Parallel and Distributed Processing Symposium, IEEE, 2007.*
Lautenbach et al., Bayesian Networks and Petri Nets, https://west.uni-koblenz.de/koblenz/fb4/forschung/publications/fachberichte/fb2006/rr-2-2006.pdf, 2006.*
Kavi et al., A Formal Definition of Data Flow Graph Models, in IEEE Transactions on Computers, vol. C-35, No. 11, Nov. 1986, pp. 940-948.*
Roy et al., Modeling Software Contention Using Colored Petri Nets, in IEEE International Symposium on Modeling, Analysis and Simulation of Computers and Telecommunication Systems, Sep. 8-10, 2008, pp. 1-8.*
Nutt, Trace Driven Petri Net Simulation, University of Colorado at Boulder, http://digitool.library.colostate.edu///exlibris/dtl/d3_1/apache_media/L2V4bGlicmIzL2R0bC9kM18xL2FwYWNoZV9tZWRpYS84xNjczMTg=.pdf, Dec. 1991.*

(Continued)

*Primary Examiner* — Wei Zhen
*Assistant Examiner* — Timothy Duncan
(74) *Attorney, Agent, or Firm* — Artegis Law Group, LLP

(57) ABSTRACT

A basic block within a thread program is characterized for convergence based on mapping the basic block to an indicator subnet within a corresponding Petri net generated to model the thread program. Each block within the thread program may be similarly characterized. Each corresponding Petri net is enumerated to generate a corresponding state space graph. If the state space graph includes an exit node with an odd execution count attribute, such as by Petri net coloring, then the corresponding basic block is divergent. The corresponding basic block is convergent otherwise. Using this characterization technique, a thread program compiler may advantageously identify all convergent blocks within a thread program and apply appropriate optimizations to the convergent blocks.

19 Claims, 8 Drawing Sheets

(56) References Cited

OTHER PUBLICATIONS

Jensen, Coloured Petri Nets, in Petri Nets: Central Models and Their Properties, Springer Berlin Heidelberg, Copyright 1987, pp. 248-299.*

Berkhard, Ordered Firing in Petri Nets, in Journal of Inforation Processing and Cybernetics, 1981, pp. 71-86.*

Stratton et al., Efficient Compilation of Fine-Grained SPMD-threaded Programs for Multicore CPUs, in Proceedings of the 8th annual IEEE/ACM International Symposium on Code Generation and Optimization, New York, 2010, pp. 111-119.*

Ahmad et al., A Technique for Reachability Graph Generation for the Petri Net Models of Parallel Processes, International Science Index vol. 3, No. 3, 2009.*

Agerwala, Putting Petri Nets to Work, in IEEE, 1979.*

Murata, Petri Nets: Properties, Analysis and Applications, in Proceedings of the IEEE, vol. 77, No. 4, Apr. 1989.*

\* cited by examiner

CONVERGENCE ANALYSIS IN MULTITHREADED PROGRAMS

BACKGROUND OF THE INVENTION

1. Field of the Invention

The invention relates generally to compiler systems and, more specifically, to convergence analysis in multithreaded programs.

2. Description of the Related Art

Certain computer systems include a parallel processing subsystem that may be configured to concurrently execute plural program threads that are instantiated from a common program. Such systems are referred to in the art as having single instruction multiple thread (SIMT) parallelism. An application program written for execution in an SIMT model may include sequential C language programming statements and calls to a specialized application programming interface (API) used for configuring and managing parallel execution of program threads. A function within an SIMT application that is destined for concurrent execution on a parallel processing subsystem is referred to as a "thread program" or "kernel." An instance of a thread program is referred to as a thread, and a set of concurrently executing threads may be organized as a thread group. Each thread may follow a different execution path based on certain identifying index variables or computational results.

During the course of following different execution paths, one set of threads may execute one branch of a conditional statement, while another set of threads may execute a different branch of the same conditional statement. In such a scenario, the two different sets of threads execute divergent paths that need to converge at some point later during execution. A synchronization barrier may be used as an explicit convergence point and may implicate a certain portion of a thread program as convergent. Other techniques are known in the art for detecting convergence based on certain ad-hoc rules, but a general technique for identifying all convergent basic blocks is not presently known in the art. Each basic block includes one entry point and one exit point in execution flow. A given basic block may be represented as a corresponding node in a control flow graph (CFG).

Certain beneficial optimizations may be applied to convergent basic blocks. In one exemplary optimization, a convergent basic block may have related data allocated to common storage for greater access efficiency. In another exemplary optimization, a convergent basic block may be scheduled to run on a specific thread processor for greater execution efficiency. Identifying each convergent basic block generally represents an opportunity to better optimize a thread program. However, as alluded to above, thread program compilers are conventionally unable to fully detect all convergent basic blocks in a general thread program and are therefore unable to fully optimize certain thread programs undergoing compilation.

As the foregoing illustrates, what is needed in the art is a technique for identifying convergent basic blocks in a thread program.

SUMMARY OF THE INVENTION

One embodiment of the present invention sets forth a computer-implemented method for characterizing a thread program, the method comprising selecting a basic block within a control flow graph corresponding to the thread program, wherein the control flow graph includes one or more block nodes corresponding to basic blocks within the thread program, generating a Petri net representation of the control flow graph that includes an indicator subnet corresponding to the selected basic block, enumerating a state space graph from the Petri net representation, wherein the state space graph includes a plurality of state nodes corresponding to a state enumeration of the Petri net representation; and determining whether the basic block is convergent based on the state space graph.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that a thread program compiler is able to advantageously detect all convergent basic blocks within a thread program. This is in contrast to prior art solutions that are only able to detect certain subsets of convergent blocks. Thus, by implementing the disclosed technique, the execution of a thread program can be more fully optimized relative to prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
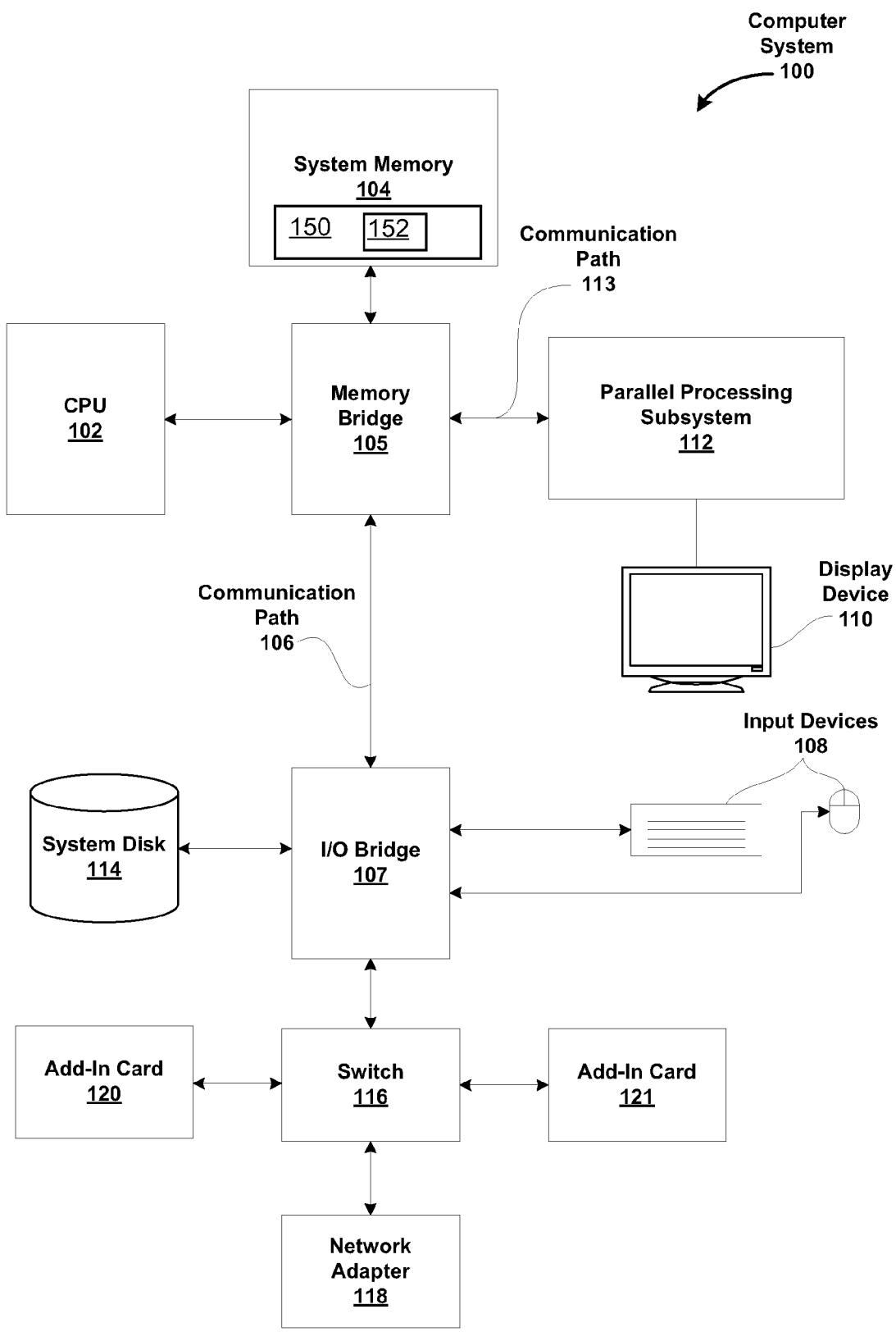
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 configured to communicate via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Certain embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In one embodiment, a thread program is compiled for execution by parallel processing subsystem 112 by a thread program compiler 150. The thread program compiler translates a source representation of the thread program into a compiled representation of the thread program. For example, the source representation may comprise original source code, such as source code written by a developer, and the compiled representation may comprise an intermediate code easily translated for execution by parallel processing subsystem 112. The compiled representation may also comprise an executable thread program suitable for direct execution by parallel processing subsystem 112. Thread program compiler 150 may be implemented within a driver module for the parallel processing subsystem that compiles the executable thread program, or as an application level module that generates either the intermediate code or executable thread program.

In addition to generating the compiled representation of the thread program, thread program compiler 150 also performs convergence analysis, described below in greater detail. In one embodiment, a convergence analysis function 152 performs convergence analysis, which allows the thread program compiler to statically determine when threads within a basic block are known to be convergent or divergent. Such analysis is significant for both program correctness and performance. In particular, thread program compiler 150 may use uniform (or "scalar") operations for thread-invariant values when threads are known to be convergent. Uniform operations may include uniform loads, scalar register accesses, and scalar instructions. Convergence analysis may enable scalarization to factor out uniform work from single instruction multiple thread (SIMT) threads. The uniform work may then be advantageously assigned to shared scalar resources to improve utilization efficiency of resources within parallel processing subsystem 112. Persons skilled in the art will recognize that convergence analysis techniques described herein are broadly applicable to many different multi-threaded system architectures, including any processor system that provides or models multi-threaded execution in combination with scalar resources.

One way of interpreting thread convergence in a basic block is that all or none of the threads within a given basic block will be collected at the barrier, which represents a convergence point. On exemplary type of barrier implemented in the CUDA™ runtime from NVIDIA™ is a _syncthreads( ) call, which blocks all associated threads until all the threads execute the same _syncthreads( ) call.

Basic block convergence analysis begins with thread program compiler 150 identifying basic block boundaries within a thread program. Each basic block is then represented as a node within a control flow graph (CFG). Each CFG node is annotated to reflect whether the corresponding basic block includes a synchronization barrier, such as the _syncthreads ( ) call.

Figure 2A:
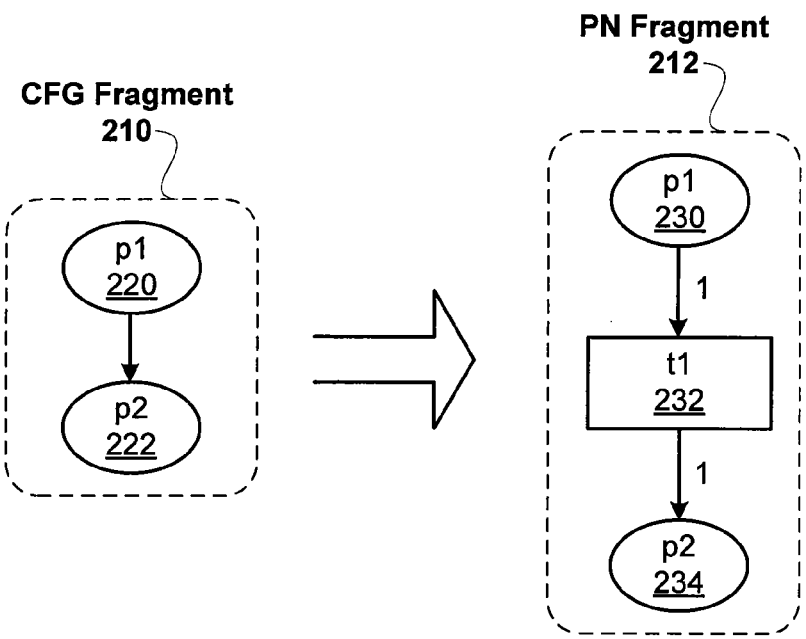
FIG. 2A illustrates an exemplary control flow graph fragment and a corresponding Petri net fragment, according to one embodiment of the present invention.

FIG. 2A illustrates an exemplary CFG fragment 210 and a corresponding Petri net (PN) fragment 212, according to one embodiment of the present invention. CFG fragment 210 includes node p1 220 and node p2 222, neither of which is annotated as being synchronization barrier nodes. PN fragment 212 includes place p1 230, transition t1 232, and place p2 234. Here, place p1 230 corresponds to node p1 220 and place p2 234 corresponds to node p2 222. Transition t1 232 is required for structural correctness within PN fragment 212. In general, for each node within a CFG that is not annotated as having a synchronization barrier, a corresponding place is added within a Petri net representation of the CFG. For convenience, each CFG node and corresponding PN place is labeled herein with the same label. For example, node p1 220 is labeled place p1 230. Furthermore, PN tokens may be labeled herein as numbers along an associated network edge.

Persons skilled in the art will recognize that a PN constructed with two tokens in an entry basic block faithfully captures the complete dynamic behavior of a corresponding thread program executed by two threads. An initial marking of the entry basic block may include two tokens.

Figure 2B:
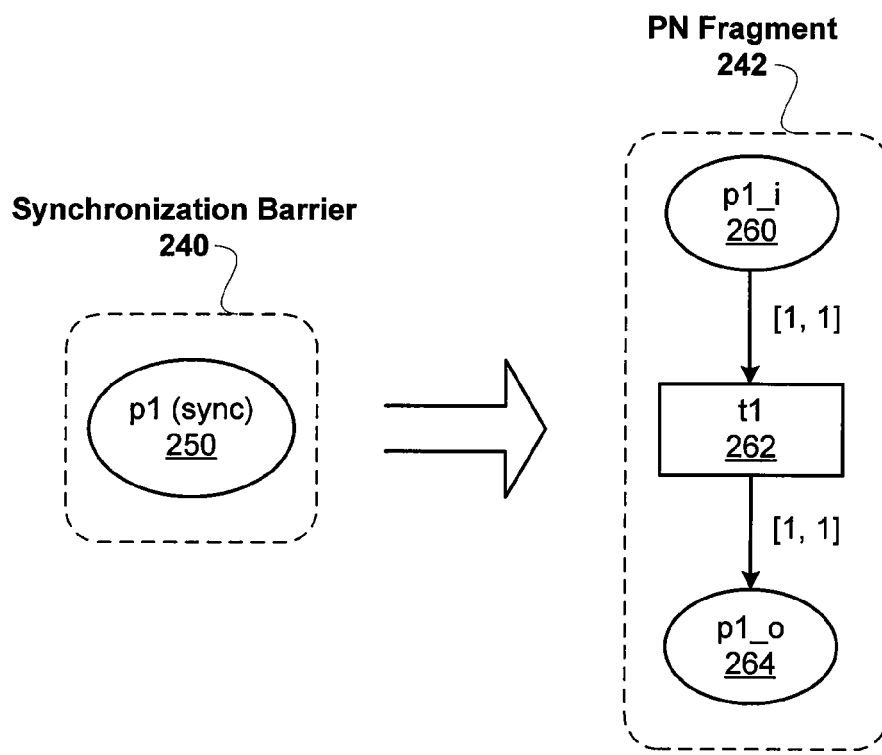
FIG. 2B illustrates an exemplary control flow graph synchronization barrier and a corresponding Petri net fragment, according to one embodiment of the present invention.

FIG. 2B illustrates an exemplary CFG synchronization barrier 240 and a corresponding PN fragment 242, according to one embodiment of the present invention. Here, synchronization barrier 240 is represented by a CFG node p1 250, which includes a synchronization barrier, such as a _syncthreads( ) call. PN fragment 242 represents node p1 250 using an input place p1_$i$, a transition 262, and an output place p1_$o$. PN 242 is illustrated for two independently executing threads, each able to post one of two input tokens, shown as "[1, 1]" along an edge connecting place p1_$i$ 260 and transition 262. When both input tokens are present at input place p1_$i$ 260, transition t1 262 consumes the two input tokens and posts two output tokens to output place p1_$o$ 264. In this way, PN fragment 242 models two independently executing threads arriving asynchronously at a synchronization barrier.

In general, a CFG may be modeled as a corresponding PN. For CFG nodes having a synchronization barrier, the mapping illustrated in FIG. 2B may be applied in generating portions of the corresponding PN. For CFG nodes without a synchronization barrier, the mapping illustrated in FIG. 2A may be applied in generating remaining portions of the corresponding PN.

Figure 3A:
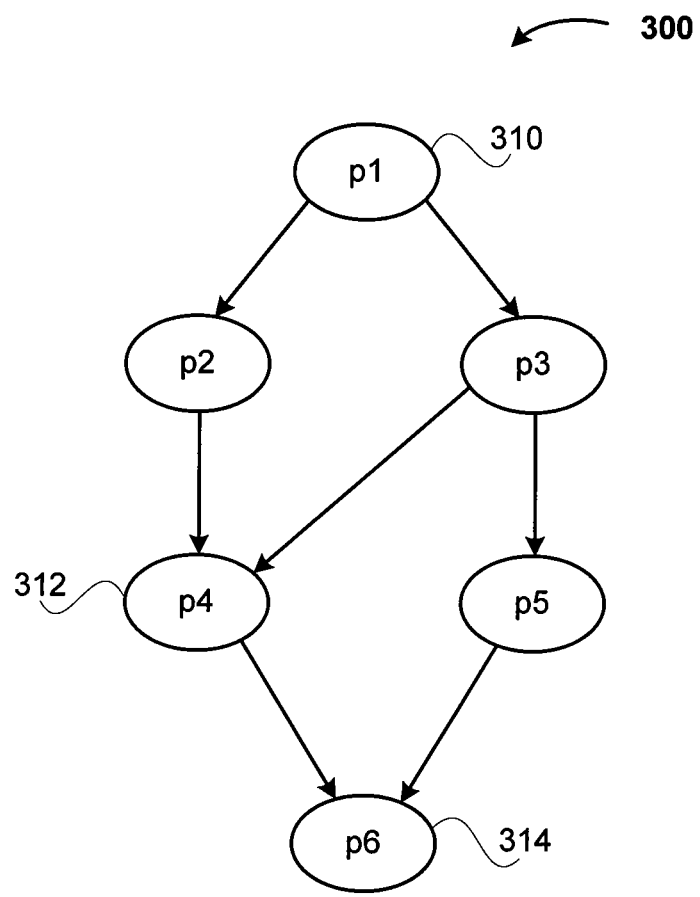
FIG. 3A illustrates an exemplary control flow graph, according to one embodiment of the present invention.

FIG. 3A illustrates an exemplary CFG 300, according to one embodiment of the present invention. As shown, CFG 300 includes entry node p1 310 and exit node 314. In this example, node 312 includes a synchronization barrier. CFG 300 is mapped to a corresponding PN (not shown).

A state space graph of a PN, such as the corresponding PN, represents instantaneous state of the PN. A marking is associated with each node of the state space graph. The marking is a list of places and a token count for each place. In general, a place may have an arbitrary number of tokens, however embodiments of the present invention limit each place in the corresponding PN to two tokens. Each one of the two tokens is associated with one of two different threads. A state space graph marking of the form "pi pk" is used herein, where pi and pk each indicate the presence of one token in the indicated place within the corresponding PN. For example, a state space graph marking of "p1 p2" on a particular node indicates place p1 and place p2 within the corresponding PN each have one token. The state space graph is therefore a state graph with nodes comprising all possible states of the PN and edges comprising all possible state transitions within the PN.

Figure 3B:
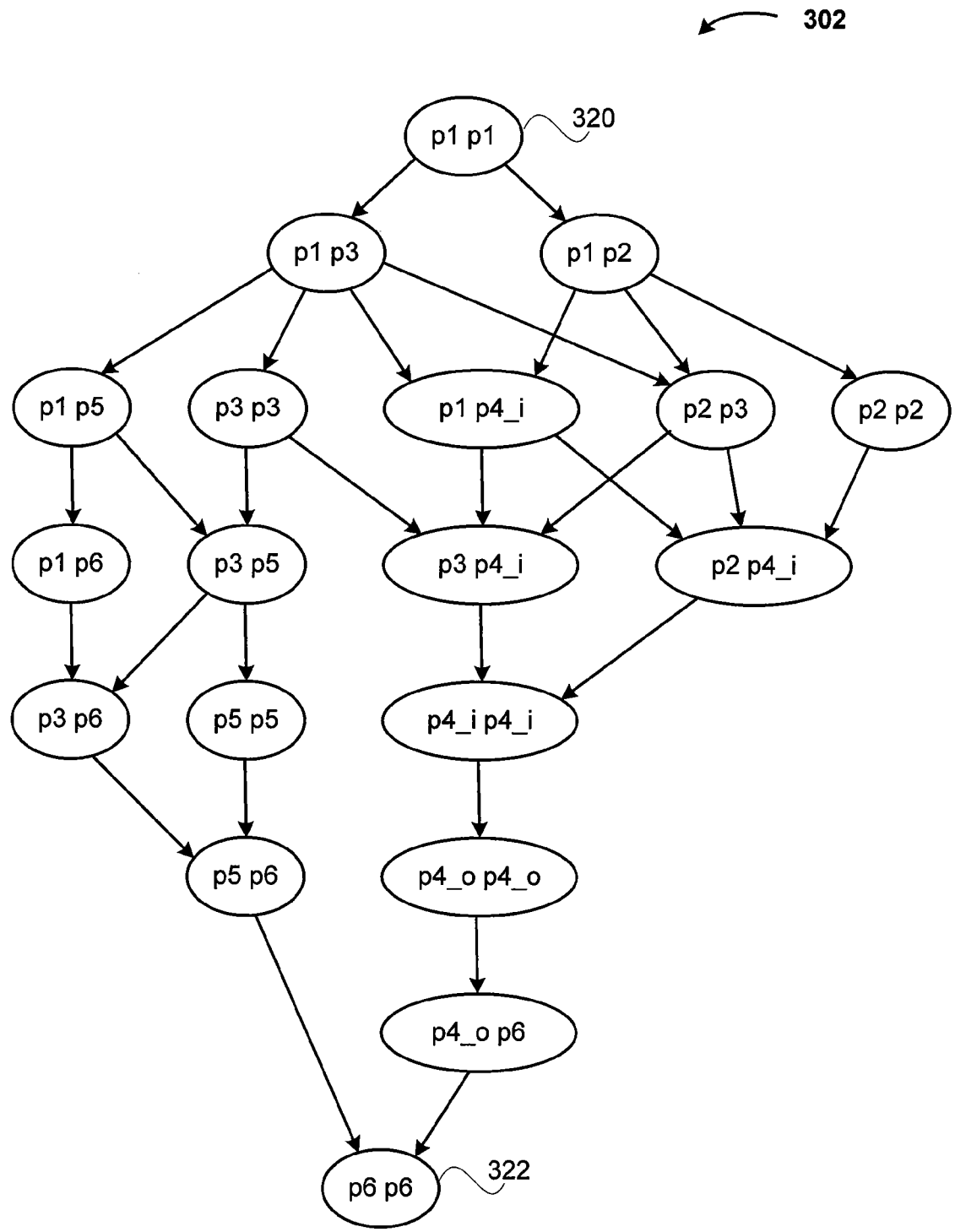
FIG. 3B illustrates a state space graph mapped from the exemplary control flow graph of FIG. 3A, according to one embodiment of the present invention.

FIG. 3B illustrates a state space graph 302 mapped from the exemplary CFG 300 of FIG. 3A, according to one embodiment of the present invention. CFG to PN mappings illustrated in FIGS. 2A and 2B are used to generate a corresponding PN. State space graph 302 is then generated from the corresponding PN using any technically feasible technique. Persons skilled in the art will recognize that various well-known techniques may be implemented to generate state space graph 302 by enumerating all states associated with the corresponding PN.

As shown, state space graph 302 includes an entry node 320 and an exit node 322. Exit node 322 is marked "p6 p6" representing an instance in time when both of two executing threads have arrived at node p6 within CFG 300. Equivalently, marking "p6 p6" indicates that both of two possible tokens are in place p6 within the corresponding PN.

Figure 4:
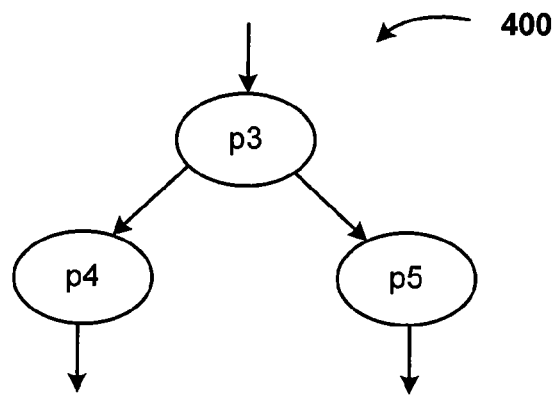
FIG. 4 illustrates a branch in a control flow graph fragment, according to one embodiment of the present invention.

FIG. 4 illustrates a branch in a CFG fragment 400, according to one embodiment of the present invention. The branch occurs at node p3 of CFG 300 of FIG. 3A, where execution flow may proceed from node p3 to either node p4 or node p5. If this branch is divergent, then during some execution instant of an associated thread program there will be one thread in p4 and another thread in p5. This state would be marked as "p4 p5" in state space graph 302 of FIG. 3B. If marking "p4 p5" is present in state space graph 302, then the branch at node p3 is divergent. However, marking "p4 p5" is not present, indicating the branch at node p3 is actually convergent.

Figure 5:
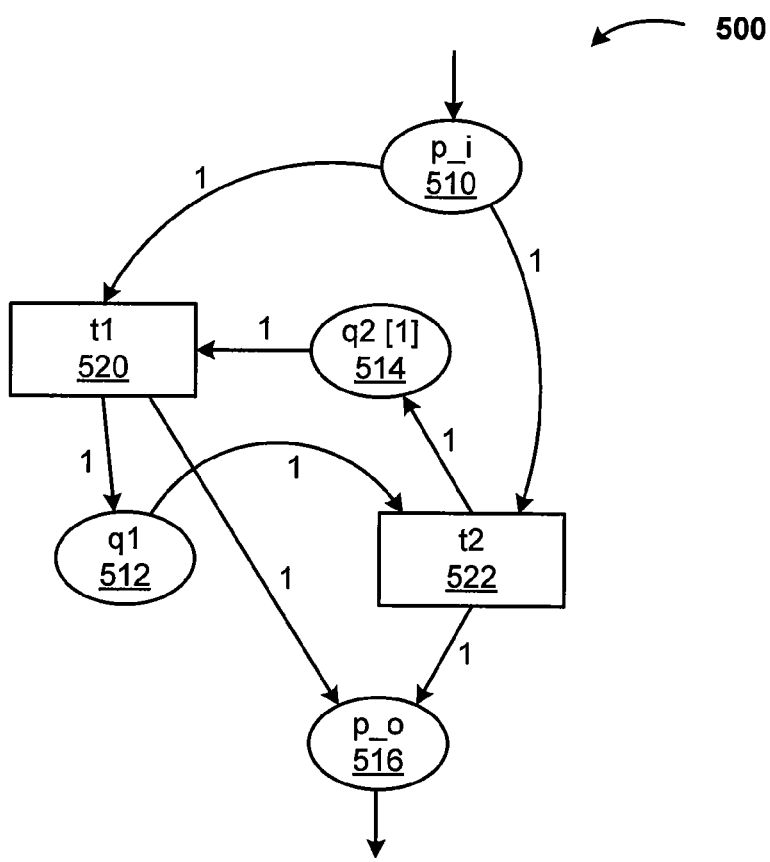
FIG. 5 illustrates an indicator subnet within a Petri net, according to one embodiment of the present invention.

FIG. 5 illustrates an indicator subnet 500 within a Petri net, according to one embodiment of the present invention. Indicator subnet 500 may be substituted for a selected node within a CFG being analyzed rather than either of the direct mappings illustrated in FIGS. 2A and 2B. To analyze convergence for a given basic block within a complete CFG, indicator subnet 500 is used to map the basic block to a complete PN for the CFG. Divergence for the basic block is then assessed in the context of the complete PN by mapping the PN to a state space graph and searching the state space graph for divergence, as described below in FIGS. 6 and 7.

Indicator subnet 500 introduces an input place p_i 510, an output place p_o 516, two indicator places q1 512 and q2 514, and two transitions t1 520, t2 522. Input place p_i 510 and output place p_o 516 respectively indicate arrival at and departure from the basic block as executed by a thread. Indicator place q1 512 and indicator place q2 514 together track how many times (modulo 2) the basic block was traversed by two different threads during execution. Indicator place q1 512 indicates an odd number of traversals, while indicator place q2 514 indicates an even number of traversals. At some instant in time, if indicator place q1 512 has a marking of 1, then the basic block was traversed an odd number of times by the two different threads. In one embodiment, indicator place q2 514 starts with an initial marking of [1], indicating the basic block was traversed zero times or an even number of times.

Figure 6:
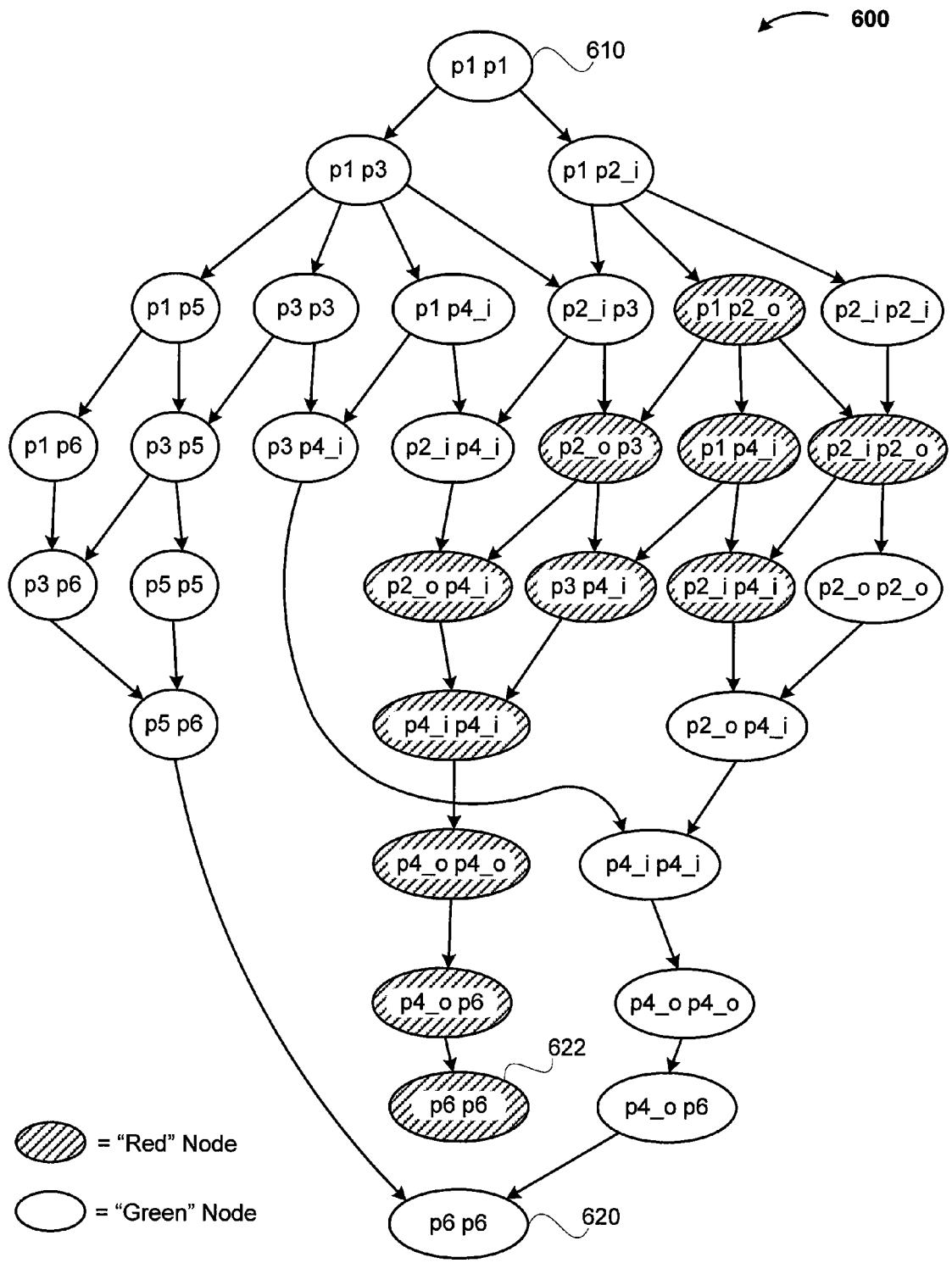
FIG. 6 illustrates a state space graph generated from a Petri net enumeration for a first modified node in a control flow graph, according to one embodiment of the present invention.

FIG. 6 illustrates a state space graph 600 generated from a PN enumeration for a modified node p2 in CFG 300 of FIG. 3A, according to one embodiment of the present invention. In this example, node p2 of CFG 300 is modified to reflect a mapping to PN subnet 500, described above in FIG. 5. Other nodes of CFG 300 are mapped according to FIG. 2A for nodes without synchronization barriers and FIG. 2B for nodes with synchronization barriers. In particular, node p4 312 includes a synchronization barrier and is therefore mapped according to FIG. 2B.

Markings that include p2_$i$ or p2_$o$ arise because node p2 of CFG 300 was modified in a corresponding PN (not shown) to an include input ("_i") place and output ("_o") place, as illustrated in FIG. 5. Markings that include p4_$i$ or p4_$o$ arise because node p4 of CFG 300 includes a synchronization barrier and is mapped to include an input place and an output place, as illustrated in FIG. 2B. Entry node 610 is marked "p1 p1" to indicate both threads start in p1 310 of CFG 300.

Each node of state space graph 600 is designated as being either a "red" node or "green" node. A "red" node is depicted herein using a hash fill, while a "green" node does not include a hash fill. A green node indicates that indicator place q2 514 of the modified node p2 in the corresponding PN had a [1] marking just before the thread program reached a state for the green node. That is, just before the thread program reached a state associated with the node, the basic block associated with p2 had been executed an even number of times by both threads. Similarly, a red node indicates that just before the thread program reached a state associated with the red node, the basic block associated with p2 had been executed an odd number of times by both threads.

Exit node p6 314 has two different corresponding exit nodes in state space graph 600. Node 622 is a red node while node 620 is a green node. Both nodes 620 and 622 have marking "p6 p6," indicating both of two different threads arrived at node p6. However, in the process, node p2 was executed an odd number of times by one of the two different threads, while node p2 was executed an even number of times by the other of two different threads. In other words, the execution count of the basic block associated with node p2 is different for each of the two different threads, indicating the basic block is not convergent.

Figure 7:
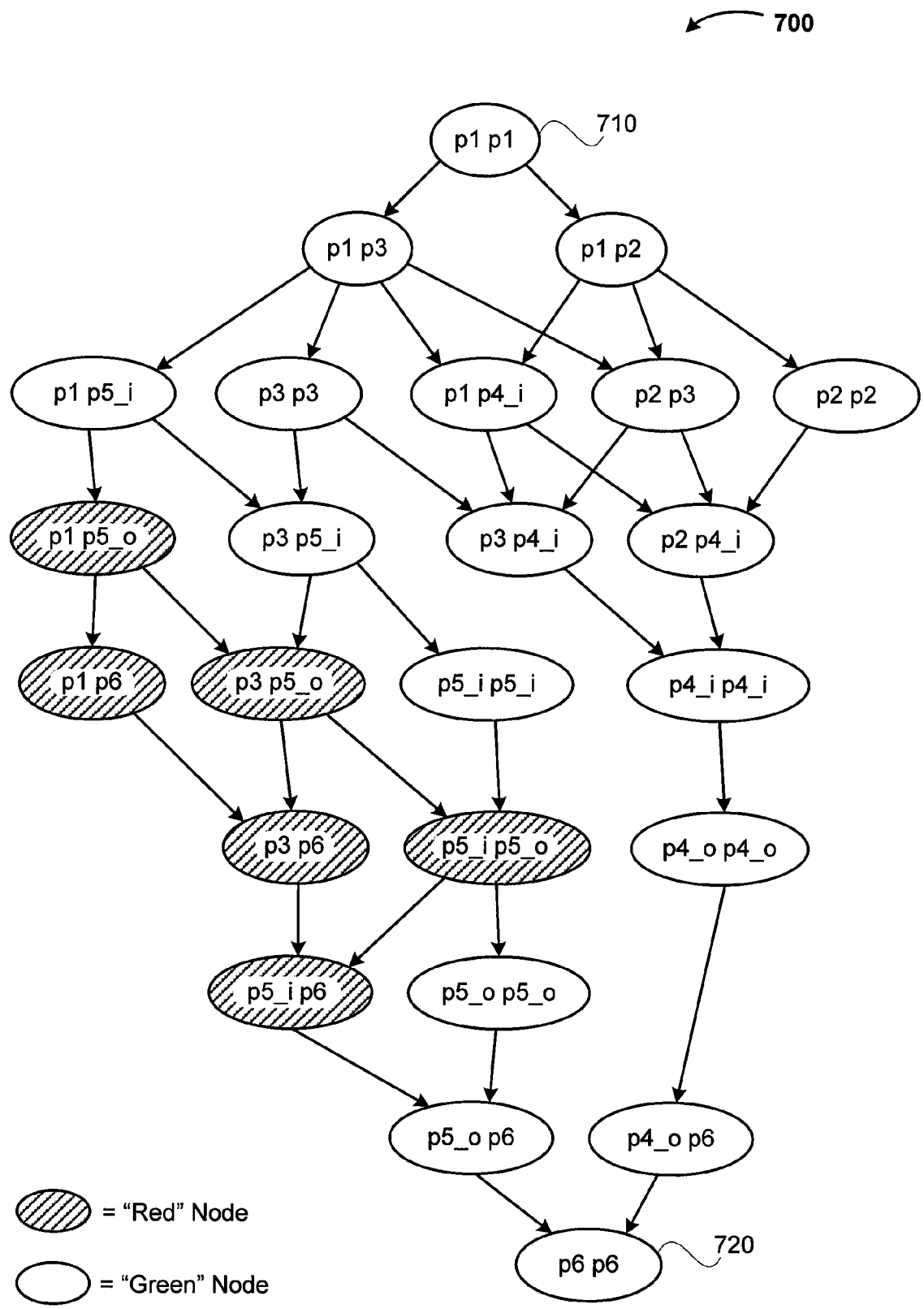
FIG. 7 illustrates a state space graph generated from a Petri net enumeration for a second modified node in a control flow graph, according to one embodiment of the present invention.

FIG. 7 illustrates a state space graph 700 generated from a PN enumeration for a modified node p5 in CFG 300 of FIG. 3A, according to one embodiment of the present invention. Here, node p5 of CFG 300 is modified (rather than mode p2) to reflect a mapping to PN subnet 500, described above in FIG. 5. Again, node p4 312 includes a synchronization barrier and is therefore mapped according to FIG. 2B. State space graph 700 begins in entry node 710 and terminates at exit node 720. Only a green node with marking "p6 p6" exists in state space graph 700. That is, for all possible legal executions of CFG 300, the basic block associated with node p5 is always executed an even number of times and therefore the basic block for node p5 is convergent.

Figure 8:
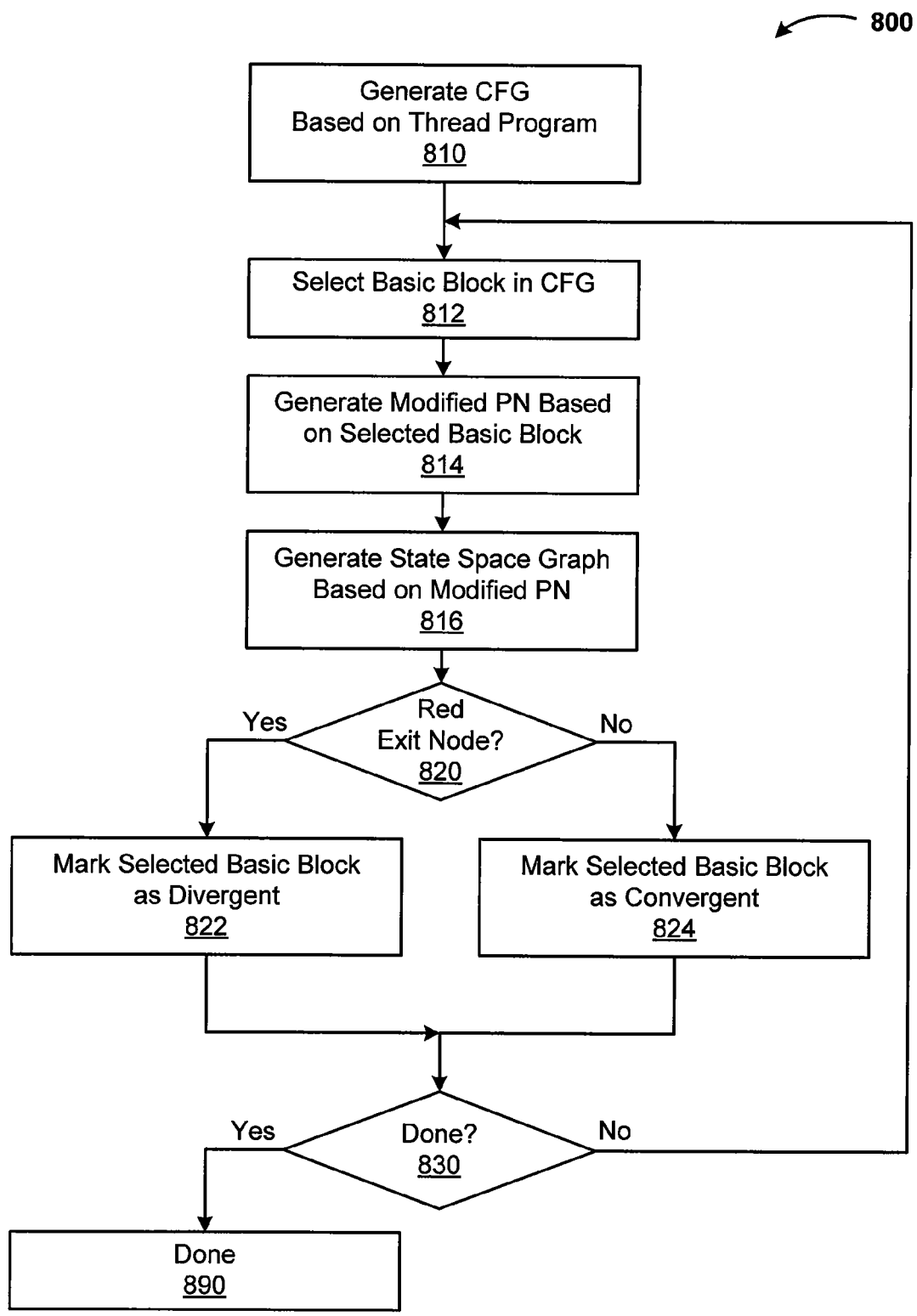
FIG. 8 sets forth a flowchart of method steps for identifying convergent basic blocks within a thread program, according to one embodiment of the present invention.

FIG. 8 sets forth a flowchart of method steps for identifying convergent basic blocks within a thread program, according to one embodiment of the present invention. Although the method steps are described in conjunction with the system of FIG. 1, persons of ordinary skill in the art will understand that any system configured to perform the method steps, in any order, is within the scope of the invention. In one embodiment, the method steps are performed by CPU 102 of FIG. 1.

As shown, method 800 begins in step 810, where a convergence analysis function, such as convergence analysis function 152 within thread program compiler 150, generates a control flow graph (CFG) from a thread program. The CFG may be generated for a thread program using any technically feasible technique. In alternative embodiments, a function other than the convergence analysis function generates the CFG. The thread program may be specified as source code, tokenized code, an intermediate code, or any other technically feasible representation. In step 812, the convergence analysis function selects a basic block from the CFG. In step 814, the convergence analysis function generates a modified Petri net (PN) for the CFG based on the selected basic block. The modified PN represents the selected basic block as an indicator subnet, such as indicator net 500 of FIG. 5. In one embodiment, the modified PN represents basic blocks within the CFG other than the selected basic block according to mappings illustrated in FIG. 2A or FIG. 2B. In step 816, the convergence analysis function generates a state space graph based on the modified PN.

If, in step 820, the state space graph includes a red exit node, then the method proceeds to step 822, where the convergence analysis function marks the selected basic block as divergent. Otherwise, if the state space graph does not include a red exit node, then the method proceeds to step 824, where the convergence analysis function marks the selected basic block as convergent. Assessing whether the state space graph includes a red exit node may be implemented using any technically feasible technique, such as performing a graph search or identifying the red exit node upon generating the state space graph.

If, in step 830, the convergence analysis function is done, then the method terminates in step 890. Otherwise, the method proceeds back to step 812, previously described herein. In one embodiment, the convergence analysis function is done after all basic blocks within the CFG have been selected and marked as either divergent or convergent.

In sum, a technique for characterizing each basic block within a thread program as being either convergent or divergent is disclosed. The technique involves representing the thread program as a control flow graph having one or more basic blocks, which are then individually analyzed for convergence. Analysis involves representing a selected basic block as an indicator subnet within a Petri net mapping of the control flow graph. State information for the Petri net is then enumerated to generate a state space graph corresponding to the selected basic block. If the state space graph includes a red exit node, then the selected basic block is identified as divergent, otherwise the selected basic block is identified a convergent.

One advantage of the disclosed technique is that a thread program compiler is able to advantageously detect all convergent basic blocks within a thread program. This is in contrast to prior art solutions that are only able to detect certain subsets of convergent blocks. Thus, by implementing the disclosed technique, the execution of a thread program can be more fully optimized relative to prior art approaches.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A computer-implemented method for characterizing a thread program, the method comprising:
   selecting a basic block within a control flow graph corresponding to the thread program, wherein the control flow graph includes one or more block nodes corresponding to basic blocks within the thread program;
   generating a Petri net representation of the control flow graph that includes an indicator subnet corresponding to the selected basic block;
   enumerating a state space graph from the Petri net representation, wherein the state space graph includes a plurality of state nodes corresponding to a state enumeration of the Petri net representation; and determining whether the basic block is convergent based on the state space graph.

2. The method of claim 1, further comprising generating the control flow graph based on the thread program.

3. The method of claim 1, wherein the indicator subnet comprises an input place, an output place, a first indication place, a second indication place, a first transition, and a second transition.

4. The method of claim 3, further comprising coloring each state node of the plurality of state nodes with either a first color or a second color based on state associated with the first indication place.

5. The method of claim 4, wherein determining comprises:
assessing whether the state space graph includes an exit node colored with the first color; and
if the state space graph includes the exit node colored with the first color, then characterizing the selected basic block as divergent, or
if the state space graph does not include the exit node colored with the first color, then characterizing the selected basic block as convergent.

6. The method of claim 3, wherein each of the two or more state nodes is labeled with a Petri net token state.

7. The method of claim 3, wherein the first indication place is initialized with a marking of one token.

8. The method of claim 1, wherein generating the Petri net representation further comprises mapping a block node from a basic block that includes a synchronization barrier to a Petri net fragment that includes an input place, an output place, and a transition.

9. A non-transitory computer-readable storage medium including instructions that, when executed by a processing unit, cause the processing unit to characterize a thread program, by performing the steps of:
selecting a basic block within a control flow graph corresponding to the thread program, wherein the control flow graph includes one or more block nodes corresponding to basic blocks within the thread program;
generating a Petri net representation of the control flow graph that includes an indicator subnet corresponding to the selected basic block;
enumerating a state space graph from the Petri net representation, wherein the state space graph includes a plurality of state nodes corresponding to a state enumeration of the Petri net representation; and
determining whether the basic block is convergent based on the state space graph.

10. The non-transitory computer-readable storage medium of claim 9, further comprising generating the control flow graph based on the thread program.

11. The non-transitory computer-readable storage medium of claim 9, wherein the indicator subnet comprises an input place, an output place, a first indication place, a second indication place, a first transition, and a second transition.

12. The non-transitory computer-readable storage medium of claim 11, further comprising coloring each state node of the plurality of state nodes with either a first color or a second color based on state associated with the first indication place.

13. The non-transitory computer-readable storage medium of claim 12, wherein determining comprises:
assessing whether the state space graph includes an exit node colored with the first color; and
if the state space graph includes the exit node colored with the first color, then characterizing the selected basic block as divergent, or
if the state space graph does not include the exit node colored with the first color, then characterizing the selected basic block as convergent.

14. The non-transitory computer-readable storage medium of claim 11, wherein each of the two or more state nodes is labeled with a Petri net token state.

15. The non-transitory computer-readable storage medium of claim 11, wherein the first indication place is initialized with a marking of one token.

16. The non-transitory computer-readable storage medium of claim 9, wherein generating the Petri net representation further comprises mapping a block node from a basic block that includes a synchronization barrier to a Petri net fragment that includes an input place, an output place, and a transition.

17. A computing device, comprising:
a processing unit;
a memory system coupled to the processing unit and including instructions that, when executed by the processing unit, cause the processing unit to:
select a basic block within a control flow graph corresponding to a thread program, wherein the control flow graph includes one or more block nodes corresponding to basic blocks within the thread program;
generate a Petri net representation of the control flow graph that includes an indicator subnet corresponding to the selected basic block;
enumerate a state space graph from the Petri net representation, wherein the state space graph includes a plurality of state nodes corresponding to a state enumeration of the Petri net representation; and
determine whether the basic block is convergent based on the state space graph.

18. The computing device of claim 17, wherein the indicator subnet comprises an input place, an output place, a first indication place, a second indication place, a first transition, and a second transition, and wherein the processing unit is further configured to color each state node of the plurality of state nodes with either a first color or a second color based on state associated with the first indication place.

19. The computing device of claim 18, wherein to determine, the processing unit is configured to:
assess whether the state space graph includes an exit node colored with the first color; and
if the state space graph includes the exit node colored with the first color, then characterize the selected basic block as divergent, or
if the state space graph does not include the exit node colored with the first color, then characterize the selected basic block as convergent.

* * * * *